(12) United States Patent
Greywall (10) Patent No.: US 7,355,317 B2
(45) Date of Patent: Apr. 8, 2008

(54) ROCKER-ARM ACTUATOR FOR A SEGMENTED MIRROR

(75) Inventor: Dennis S. Greywall, Whitehouse Station, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 285 days.

(21) Appl. No.: 11/095,076

(22) Filed: Mar. 31, 2005

(65) Prior Publication Data

US 2006/0220492 A1    Oct. 5, 2006

(51) Int. Cl.
    *H02N 1/00*     (2006.01)
    *G02B 26/08*   (2006.01)
(52) U.S. Cl. .................. 310/309; 359/291; 359/225
(58) Field of Classification Search ............. 310/309; 359/223–226, 290, 291
    See application file for complete search history.

(56) References Cited

U.S. PATENT DOCUMENTS

| | | | | |
|---|---|---|---|---|
| 5,245,464 A * | 9/1993 | Jensen | ........................ | 359/224 |
| 5,501,893 A | 3/1996 | Laermer et al. | ............ | 428/161 |
| 5,629,790 A | 5/1997 | Neukermans et al. | ....... | 359/198 |
| 5,691,541 A | 11/1997 | Ceglio et al. | ............ | 250/492.1 |
| 6,201,631 B1 | 3/2001 | Greywall | ................... | 359/245 |
| 6,220,561 B1 * | 4/2001 | Garcia | ........................ | 248/487 |
| 6,480,320 B2 * | 11/2002 | Nasiri | ........................ | 359/291 |
| 6,533,947 B2 * | 3/2003 | Nasiri et al. | ................... | 216/2 |
| 6,545,385 B2 * | 4/2003 | Miller et al. | ................. | 310/309 |
| 6,667,823 B2 | 12/2003 | Greywall | ................... | 359/224 |
| 6,760,144 B2 * | 7/2004 | Hill et al. | ................... | 359/290 |
| 6,865,313 B2 * | 3/2005 | Mao et al. | .................... | 385/18 |
| 6,876,484 B2 * | 4/2005 | Greywall | ................... | 359/291 |
| 6,980,339 B2 * | 12/2005 | Greywall et al. | .......... | 359/198 |
| 6,995,895 B2 * | 2/2006 | Greywall | ................... | 359/290 |
| 7,099,063 B2 * | 8/2006 | Greywall | ................... | 359/290 |
| 2004/0190110 A1 | 9/2004 | Greywall | ................... | 359/291 |
| 2006/0220492 A1 * | 10/2006 | Greywall | ................... | 310/309 |

* cited by examiner

*Primary Examiner*—Karl Tamai (57) ABSTRACT

A MEMS device having a movable plate supported on a substrate by a support structure that is hidden under the plate and yet which can be implemented to enable rotation of the plate with respect to the substrate about a rotation axis lying at the plate surface. As a result, the support structure does not take up any area within the plane of the plate, while enabling rotation of the plate, during which the plate does not substantially move sideways. The latter property reduces potential physical interference between neighboring plates in an arrayed MEMS device and enables implementation of a segmented mirror having relatively narrow gaps between adjacent segments and, thus, a relatively large fill factor, e.g., at least 98%.

24 Claims, 10 Drawing Sheets

ROCKER-ARM ACTUATOR FOR A SEGMENTED MIRROR

The U.S. Government has a paid-up license in this invention and the right in limited circumstances to require the patent owner to license others on reasonable terms as provided for by the terms of contract No. HR0011-04-C-0048 awarded by DARPA under CCIT.

BACKGROUND OF THE INVENTION

1. Field of the Invention

The present invention relates to adaptive optics and spatial light modulators for optical maskless lithography (OML) and, more specifically, to micro-electromechanical systems (MEMS) for implementing adaptive optics and/or spatial light modulators.

2. Description of the Related Art

Adaptive optics is a field of optics dedicated to the improvement of optical signals using information about signal distortions introduced by the environment in which the optical signals propagate. A representative example of an adaptive optical element is a deformable mirror driven by a wavefront sensor. An excellent introductory text on the subject is given in "Principles of Adaptive Optics" by R. K. Tyson, Academic Press, San Diego, 1991, the teachings of which are incorporated herein by reference.

Optical maskless lithography (OML) is an emerging technology intended as a replacement for conventional mask-based lithography, e.g., in low-volume production of integrated circuits. A detailed description of a representative OML system can be found, for example, in U.S. Pat. No. 5,691,541, the teachings of which are incorporated herein by reference. Briefly, instead of a permanent glass mask employed in conventional mask-based lithography, OML uses a configurable deformable mirror to project and imprint a desired image onto the substrate. Since the deformable mirror can be relatively easily reconfigured to project and imprint a new image, the cost of low-volume device production, which has largely been determined by the cost of production, inspection, repair, and protection of lithographic masks, can significantly be reduced.

One frequently used type of deformable mirror is a segmented mirror, in which each segment (pixel) can be individually translated and/or rotated. For many applications, a segmented mirror is required to have: (1) for each segment, relatively large translation and rotation magnitudes and (2) for the mirror as a whole, a fill factor of at least 98%. However, for many prior-art designs, these requirements are in direct conflict with each other and therefore difficult or even impossible to meet. For example, the high fill-factor requirement suggests a solution, in which mirror support elements and motion actuators are placed beneath (hidden under) the mirror. One result of this placement is that each segment typically rotates about an axis lying below the mirror surface and therefore is subjected to a lateral displacement within the mirror plane during rotation. To prevent physical interference with the neighboring mirror segments caused by this displacement, the spacing between the segments is increased. The latter, however, reduces the fill factor.

SUMMARY OF THE INVENTION

Problems in the prior art are addressed, in accordance with the principles of the present invention, by a MEMS device having a movable plate supported on a substrate by a support structure that is hidden under the plate and yet which can be implemented to enable rotation of the plate with respect to the substrate about a rotation axis lying at the plate surface. Advantageously, the support structure does not take up any area within the plane of the plate, while enabling rotation of the plate, during which the plate does not substantially move sideways. Further advantageously, the latter property reduces potential physical interference between neighboring plates in an arrayed MEMS device and enables implementation of a segmented mirror having relatively narrow gaps between adjacent segments and, thus, a relatively large fill factor, e.g., at least 98%.

In one embodiment, a MEMS device of the invention has a deformable beam connected between two rocker arms, each rocker arm movably supported on a substrate and adapted to rotate with respect to the substrate about a corresponding sway axis. These rotations of the rocker arms deform the deformable beam and cause it to move with respect to the substrate such that motion of a portion of the deformable beam defines a first rotation axis offset from the substrate by an offset distance that is greater than an offset distance for any part of the rocker arms and the deformable beam. One or more additional rocker arms connected to the deformable beam can be used to similarly define an additional rotation axis different from the first rotation axis, thereby enabling a two-axis rotation for a mass (e.g., a mirror) mounted on the deformable beam. A piston-like motion for the mass can further be added by mounting the rocker arms on a support frame adapted to move as a whole with respect to the substrate.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1A:
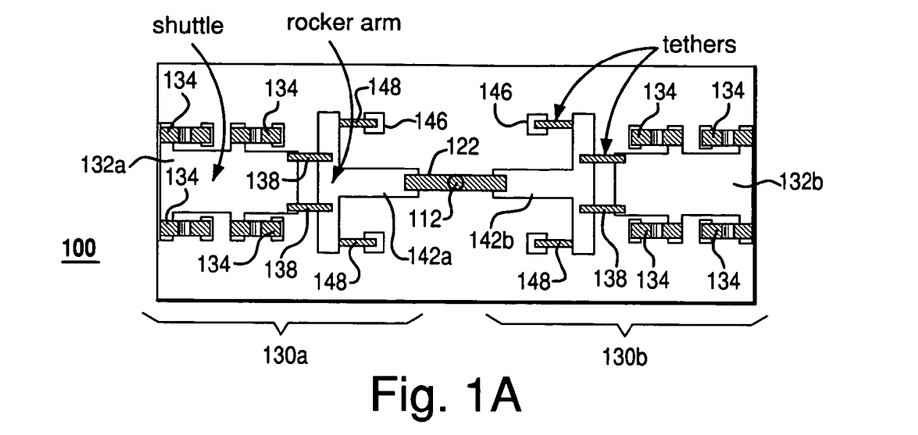
FIGS. 1A-C show top and side views of a MEMS device according to one embodiment of the invention.
Figure 1B:
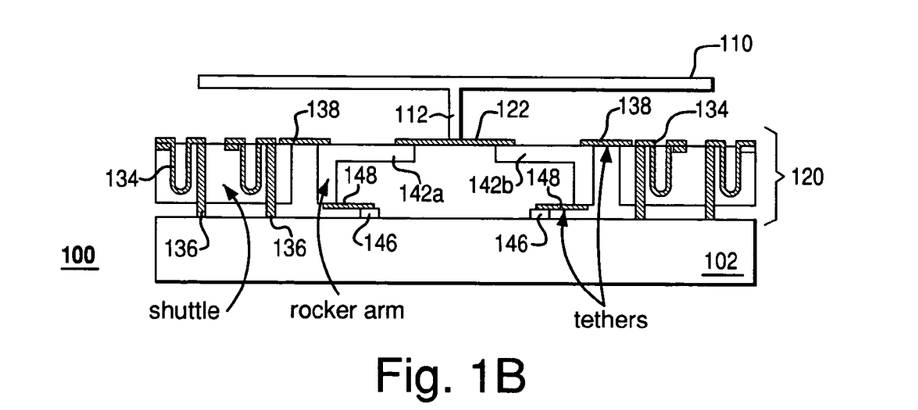
Figure 1C:
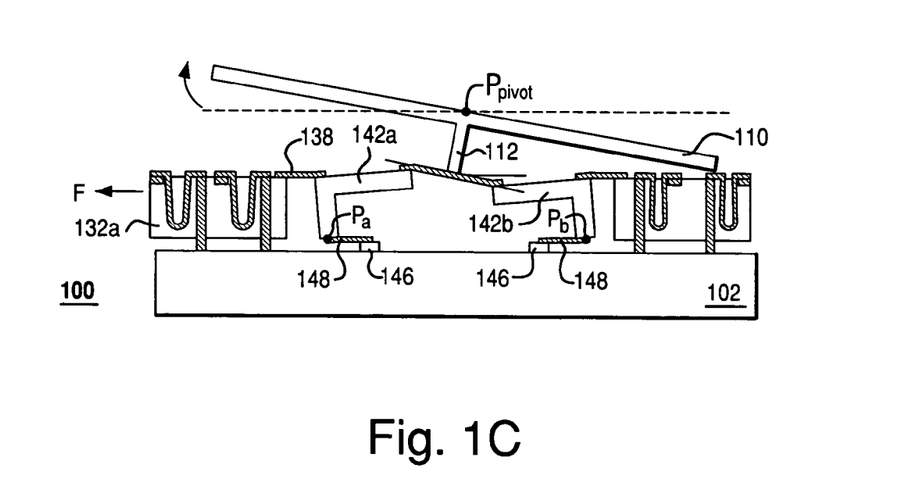

FIGS. 1A-C show top and side views of a MEMS device 100 according to one embodiment of the invention. More specifically, FIG. 1A shows a cutout top view of device 100, and FIGS. 1B-C show side views of the device with its movable plate 110 in two different rest positions. Movable plate 110 in device 100 is mounted on a motion actuator 120, which is supported on a substrate 102. In one embodiment, plate 110 has a reflective top surface and can serve as a segment of a segmented mirror. Actuator 120 has two actuator portions 130a-b coupled together by a deformable support beam 122 to which plate 110 is connected by a support pole 112. Each actuator portion 130 has a shuttle 132 coupled to a rocker arm 142 by a pair of tethers 138 as shown in FIG. 1. A tether is a deformable structure that can flex and rotate, but resists stretching. In one embodiment, each tether 138 is a thin flexing beam, and support beam 122 is a tether.

Each shuttle 132 is suspended over substrate 102 by four springs 134, each attached between the shuttle and a corresponding support post 136. A comb drive (not shown) is connected to each shuttle 132 to enable motion of the shuttle parallel to the plane of substrate 102. For example, when the comb drive connected to shuttle 132a generates force F as shown in FIG. 1C, shuttles 132a-b move from their respective first rest positions shown in FIG. 1B to their respective second rest positions shown in FIG. 1C. In the latter rest positions, springs 134 are deformed such that the resulting spring forces counter-balance force F. When the comb drive connected to shuttle 132a is deactivated, i.e., no longer generates force F, the spring forces return shuttles 132a-b back to their respective first rest positions (FIG. 1B).

Each rocker arm 142 is suspended over substrate 102 with a pair of tethers 148, each attached between the rocker arm and a corresponding support post 146. For each rocker arm 142, tethers 148 define a sway axis, which runs through the areas of attachment of these tethers to the rocker arm substantially parallel to the plane of substrate 102. In FIG. 1C, these sway axes for rocker arms 142a-b are labeled $P_a$ and $P_b$, respectively. When shuttle 132a is pulled by force F, the corresponding tethers 138 transfer the pull to rocker arm 142a causing the rocker arm to rotate about sway axis $P_a$ as shown in FIG. 1C. At the same time, support beam 122 transfers the motion of rocker arm 142a to rocker arm 142b causing the latter to rotate about sway axis $P_b$. The rotations of rocker arms 142a-b cause support beam 122 to deform and to tilt support pole 112, which in turn tilts plate 110 as shown in FIG. 1C. As further demonstrated below, geometric proportions of rocker arms 142a-b, support pole 112, and support beam 122 can be chosen such that the tilting motion of plate 110 generated by actuator 120 is a rotation about an axis labeled $P_{pivot}$ in FIG. 1C, which axis is located within the plane of the plate.

Advantageously, device 100 can be used to implement a segment of a segmented mirror, wherein each mirror segment (plate 110) has a relatively large rotation magnitude, and the segmented mirror as a whole has a relatively large fill factor, e.g., at least 98%. The relatively large fill-factor can be achieved due to the fact that, in device 100, the support structure for plate 110, which includes motion actuator 120 and support pole 112, is located beneath (hidden under) the plate and yet defines a rotation axis located within the plane of the plate, and preferably at the top surface of the plate. As a result, the support structure does not take up any area within the plane of the segmented mirror while each mirror segment can still rotate substantially without moving sideways. The latter fact allows the segmented mirror to have relatively narrow gaps between the segments and, thus, a relatively large fill factor.

Figure 2:
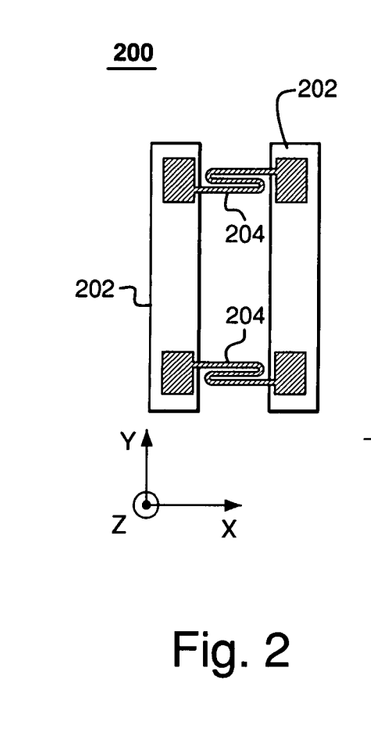
FIG. 2 shows a tether that can be used in the device of FIG. 1 according to one embodiment of the invention.

FIG. 2 shows a tether 200, which can be used in device 100 according to one embodiment of the invention. More specifically, one or more tethers 200 can be used in place of one or more tethers 138 and/or 148 in device 100. Tether 200 has a pair of bars 202 connected by a pair of serpentine springs 204. Springs 204 are designed to be relatively stiff with respect to deformations along the X direction and relatively soft with respect to deformations along the Y and Z directions. As a result, a relatively large deformation force is required for stretching tether 200 along the X direction. In contrast, tether 200 can be twisted or bent relatively easily in either one or both of the Y and Z directions. By appropriately choosing the parameters of springs 204, tether 200 can be designed to have elastic characteristics different from those accessible with a solid-flexible-beam tether design.

Figure 3A:
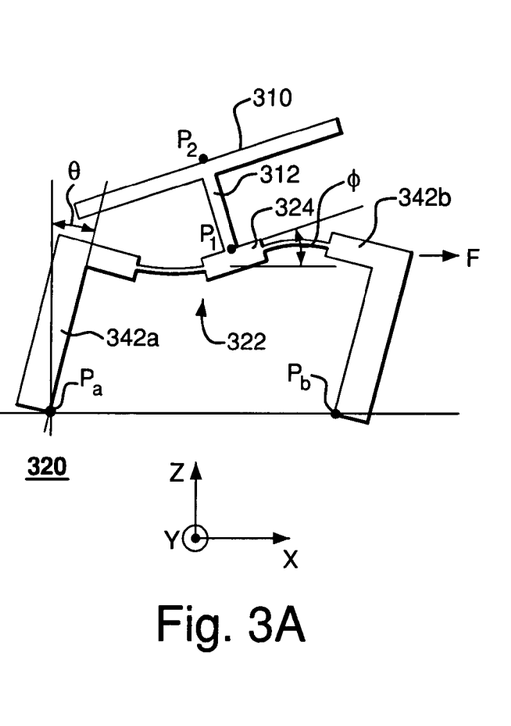
FIG. 3A-B shows a geometric model of a motion actuator that can be used in the device of FIG. 1 according to one embodiment of the invention.
Figure 3B:
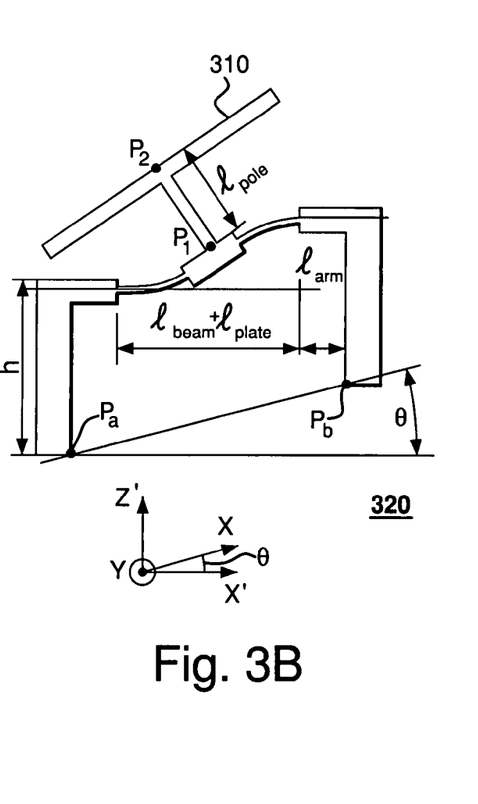

FIG. 3 shows a geometric model of a motion actuator 320, which can be used in device 100 according to one embodiment of the invention. More specifically, actuator 320 is generally similar to actuator 120, with analogous elements in the two actuators marked with labels having the same last two digits. However, one difference between actuators 120 and 320 is that, unlike support beam 122 in the former, support beam 322 in the latter has a rigid support plate 324 located within the beam's middle portion. In addition, rocker arms 342a-b are suspended above the substrate (not shown) such that each of sway axes $P_a$ and $P_b$ is located at a bottom edge of the corresponding rocker arm.

FIG. 3 shows actuator 320 in a state, in which each of rocker arms 342a-b is tilted by angle θ with respect to the axis orthogonal to the plane of the substrate, with FIG. 3A showing a view, in which the plane of the substrate is parallel to the XY plane, and FIG. 3B showing a view, in which the tilted rocker arm is parallel to the Z' axis while the plane of the substrate forms angle θ with the X'Y plane. Plate 310 is connected to support plate 324 by support pole 312 having a length of $l_{pole}$. Point $P_2$ having coordinates $(x(P_2), z(P_2))$ is located near the area of attachment of pole 312 to plate 310. The coordinate system XYZ (FIG. 3A) is defined such that, when θ=0 (at F=0), $(x(P_2), z(P_2))≡(0,0)$. The sought geometric proportions for actuator 320 are determined by the following condition: when θ≠0, point $P_2$ remains at (0,0).

At relatively small angles θ, coordinates $(x(P_2), z(P_2))$ can be expressed as follows:

$$x(P_2) \approx l_{pole}\phi - x(P_1) \approx l_{pole}\phi - h\theta = 0 \quad (1a)$$

$$z(P_2) \approx 0 \quad (1b)$$

where point $P_1$ is located near the area of attachment of pole 312 to support plate 324; φ is the angle between support plate 324 (or alternatively plate 310) and axis X (see FIG. 3A); and h is the height of rocker arm 342. The geometric relationship between angles φ and θ is given by Eq. (2) as follows:

$$\frac{\theta}{\phi} \approx \frac{2 + 3\frac{l_{plate}}{l_{beam}}}{1 + 6\frac{l_{arm}}{l_{beam}}} \equiv \zeta \quad (2)$$

where $l_{plate}$ is the width of support plate 324; $l_{beam}$ is the length of the flexible portion of support beam 322; and $l_{arm}$ is the length of rocker arm 342. Combining Eqs. (1a) and (2), we find that the sought geometric proportions for actuator 320 are constrained by Eq. (3) as follows:

$$\frac{l_{pole}}{h} = \zeta \quad (3)$$

Figure 4:
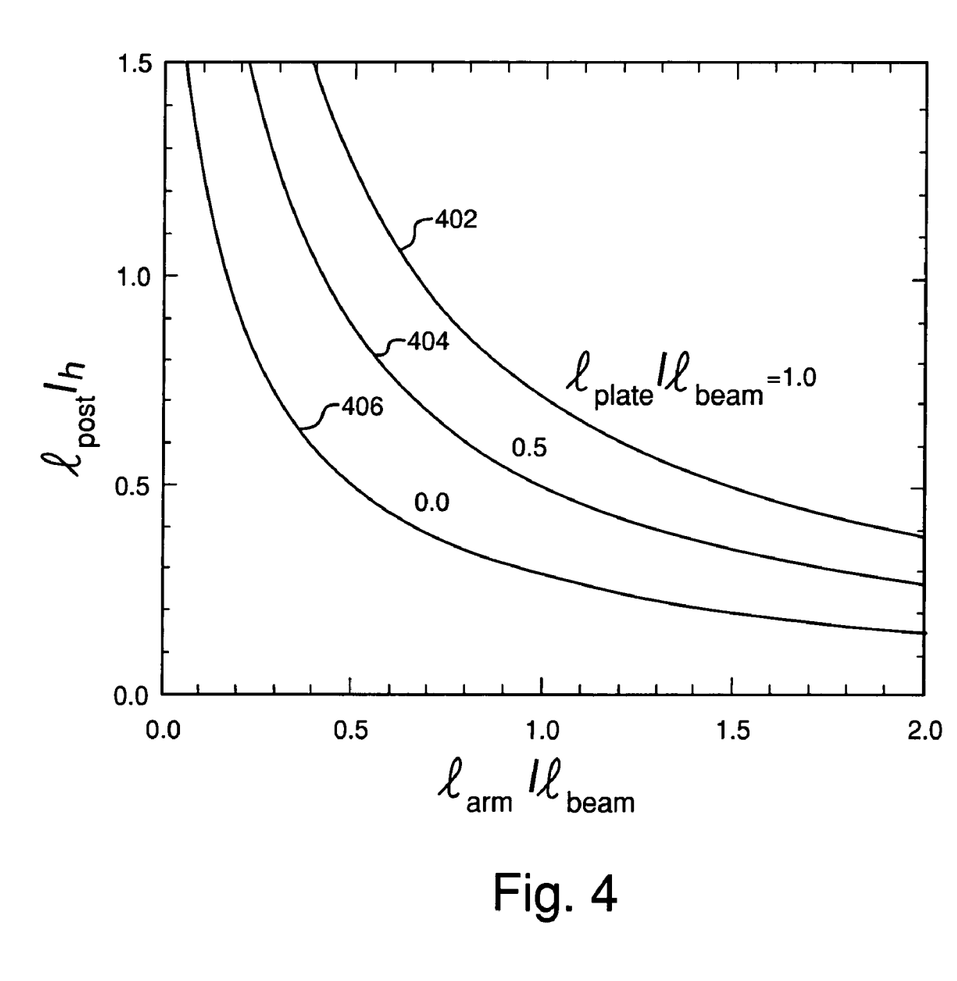
FIG. 4 graphically illustrates how to choose geometric proportions for the motion actuator of FIG. 3 to enable the actuator to produce rotations about an axis located at the top surface of the attached movable plate.

FIG. 4 shows a parametric plot of Eq. (3) for three representative values of $l_{plate}/l_{beam}$. For example, curve 402 represents Eq. (3) when $l_{plate}/l_{beam}=1.0$. If actuator 320 is implemented such that $l_{plate}/l_{beam}=1.0$, then the rotation axis for plate 310 will be located at the top surface of the plate as long as the other sizes in the actuator are selected to correspond to a point on curve 402. Similarly, curves 404 and 406 represent Eq. (3) for $l_{plate}/l_{beam}=0.5$ and 0.0, respectively. Note that, in a special case of $l_{plate}=l_{arm}=1.0$, $l_{pole}=2h$. In another special case, $l_{plate}=l_{arm}=l_{beam}$ and $l_{pole}=(5/7)h$.

Figure 5A:
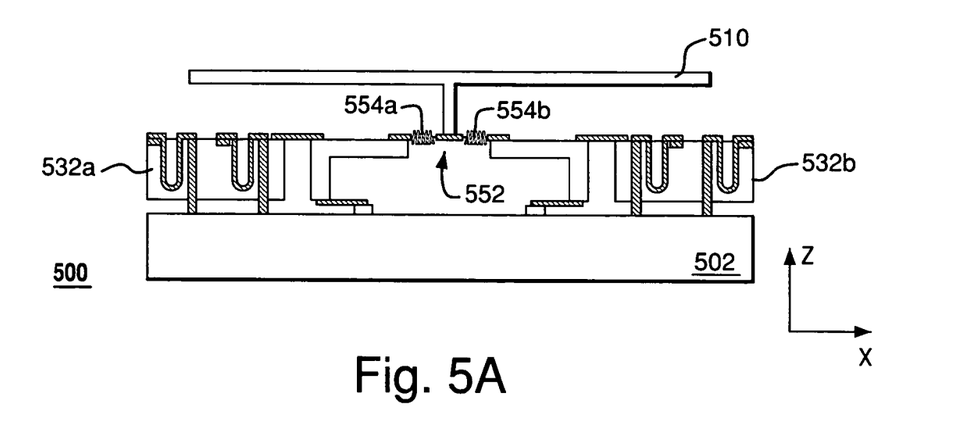
FIGS. 5A-B show side views of a MEMS device according to another embodiment of the invention.
Figure 5B:
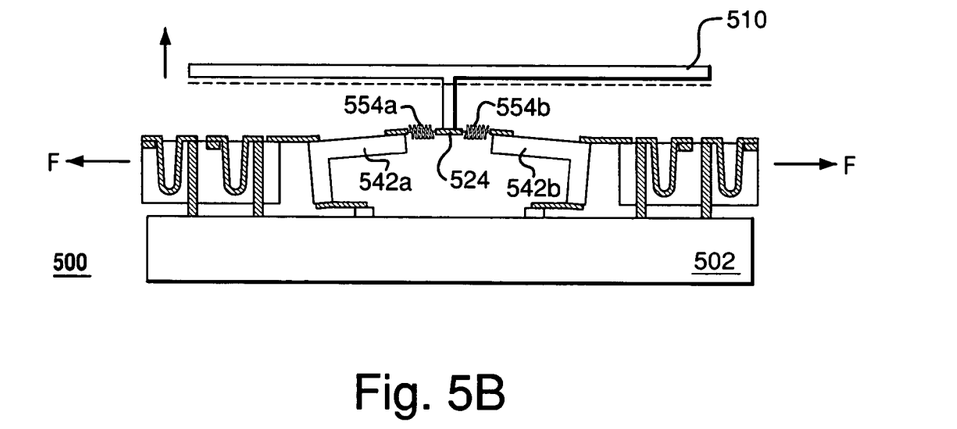

FIGS. 5A-B show side views of a MEMS device 500 according to another embodiment of the invention. More specifically, FIGS. 5A-B show side views of device 500 with its movable plate 510 in two different rest positions. Device 500 is generally similar to device 100 of FIG. 1, with analogous elements in the two actuators marked with labels having the same last two digits. However, one difference between devices 100 and 500 is that, instead of deformable support beam 122 having characteristics of a tether in the former device, the latter device has a stretchable support structure 552. In one embodiment, support structure 552 incorporates springs 554a-b, each of which can be elongated along the X direction. For example, when the comb drives (not shown) connected to shuttles 532a-b generate opposing forces F as shown in FIG. 5B, shuttles 532a-b move from their respective first rest positions shown in FIG. 5A to their respective second rest positions shown in FIG. 5B, thereby tilting rocker arms 542a-b and stretching springs 554a-b. As a result, a middle portion 524 of support structure 552 is elevated, thereby translating plate 510 along the Z axis away from substrate 502 as indicated in FIG. 5B. Note that, when the comb drives connected to shuttles 532a-b generate opposing but unequal forces, plate 510 is tilted in the direction of the smaller force and its center of mass moves away from substrate 502. As such, translation and rotation of plate 510 are not independent of one another in device 500.

Figure 6A:
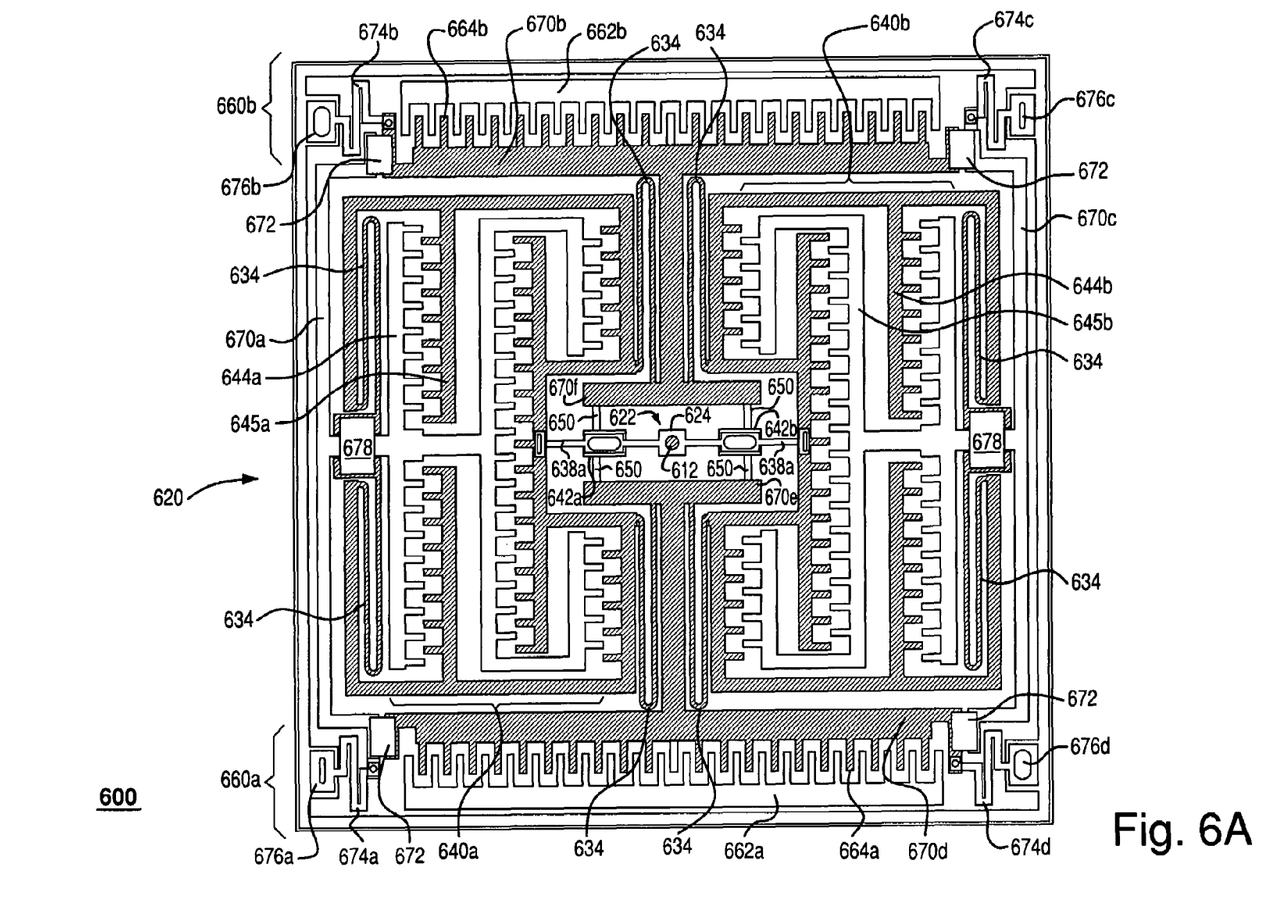
FIGS. 6A-E show top and cross-sectional views of a MEMS device according to yet another embodiment of the invention.

FIG. 6A shows a cutout top view of a MEMS device 600 according to yet another embodiment of the invention. More specifically, FIG. 6A shows device 600 with its movable plate, which is analogous to movable plate 110 (FIG. 1) or 510 (FIG. 5), removed to expose the layout of (1) an underlying rocker-arm (RA) actuator 620, which enables rotation of the movable plate, and (2) an out-of-plane comb-drive (OPCD) actuator 660, which enables translation of the movable plate. As such, device 600 is similar to device 500 of FIG. 5 in that it enables both translation and rotation of its movable plate. However, one difference between devices 500 and 600 is that translation and rotation of the movable plate in the latter device are independent of one another, unlike those in former device.

RA actuator 620 of device 600 is generally similar to actuator 320 shown in FIG. 3, with analogous elements in the two actuators marked with labels having the same last two digits. The (not-shown) movable plate of device 600 attaches to support pole 612, which is mounted on support plate 624 of support beam 622. Support beam 622 is connected between rocker arms 642a-b, each of which is attached to a support frame 670 by a pair of torsion rods 650. Support frame 670 is formed by (1) sections 670a-d connected together to form a generally rectangular outer rim and (2) two additional T-shaped sections 670e-f, which extend into the area circumscribed by the outer rim. More specifically, the outer rim of frame 670 is formed by two C-shaped sections 670a,c and two side sections 670b,d, which are connected together by four electrically isolating linkers 672. T-shaped sections 670e,f are attached to middle portions of side sections 670d,b, respectively, and rocker arms 642a-b are attached to the T-shaped sections by torsion rods 650.

Support frame 670 as whole is movably suspended over a substrate 602 (see FIG. 6E) by four electrically conductive springs 674a-d, each of which is connected between the corresponding section of the support frame and one of support pads 676a-d. As a result, sections 670a, 670b,f, 670c, and 670d,e are electrically connected to support pads 676a, 676b, 676c, and 676d, respectively, and have the same electric potentials as their respective pads. In one embodiment, support pads 676b,d are electrically connected to substrate 602 and are grounded, while support pads 676a,c are electrically isolated from the substrate such that each of them can be independently biased with respect to the substrate.

RA actuator 620 has two comb drives 640a-b, each having two interleaved multi-comb portions 644 and 645. More specifically, comb drive 640a has multi-comb portions 644a and 645a, and comb drive 640b has multi-comb portions 644b and 645b. Each multi-comb portion 644 is movably connected to support frame 670 via four springs 634, where (1) two of these springs are connected between the multi-comb portion and T-shaped sections 670e,f, respectively, and (2) the other two springs are connected between the multi-comb portion and a corresponding bridge structure 678 attached to the corresponding one of C-shaped sections 670a,c. Each multi-comb portion 645 is fixedly connected to the corresponding one of C-shaped sections 670a,c of support frame 670 via the corresponding bridge structure 678.

Each bridge structure 678 is designed to electrically isolate multi-comb portions 644 and 645 from one another, while, at the same time, electrically connecting multi-comb portion 645 to the corresponding C-shaped section of support frame 670. Springs 634 are preferably electrically conductive, thereby electrically connecting each multi-comb portion 644 to sections 670b,d,e,f. As a result, multi-comb portions 644a and 645a of comb drive 640a can be electrically biased with respect to one another, e.g., by applying a voltage differential between support pads 676a-b. Similarly, multi-comb portions 644b and 645b of comb drive 640b can be electrically biased with respect to one another, e.g., by applying a voltage differential between support pads 676c-d.

In one configuration, RA actuator 620 operates as follows. When a voltage differential is applied between support pads 676a-b, while support pads 676c-d are grounded, an attractive electrostatic force (F) is generated between multi-comb portions 644a and 645a of comb drive 640a causing multi-comb portion 644a to move with respect to support frame 670, thereby generating a (leftward) pull on tether 638a and deforming springs 634, which provide counterbalance spring forces to the electrostatic force. When the voltage differential is removed, the spring forces return multi-comb portion 644a into the initial rest position. Similarly, a (rightward) pull on tether 638b can be generated by the application of a voltage differential between support pads 676c-d while grounding support pads 676a-b.

Figure 6B:
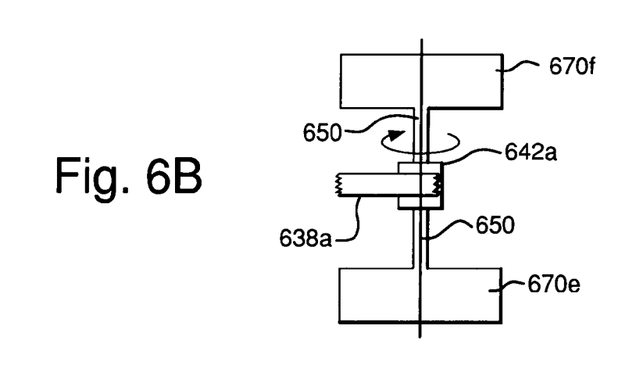
Figure 6C:
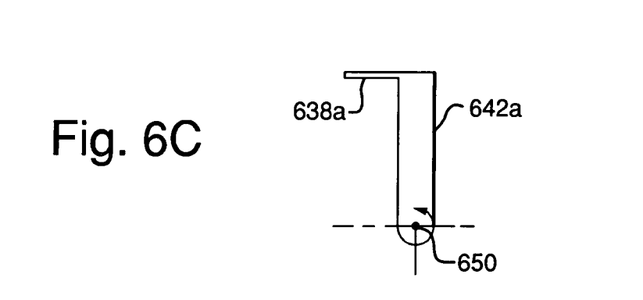
Figure 6D:
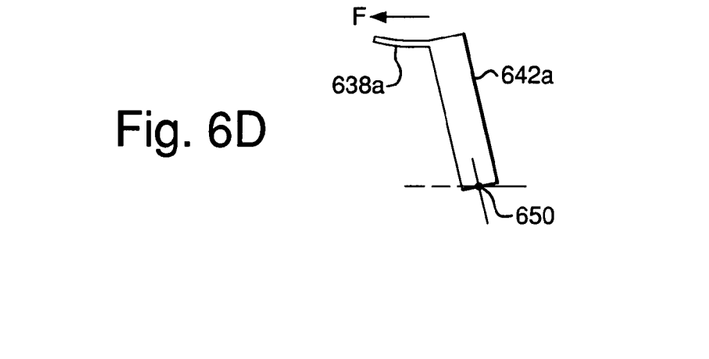

FIGS. 6B-D show an enlarged view of a portion of RA actuator 620 having rocker arm 642a. More specifically, FIG. 6B is a top view similar to that shown in FIG. 6A, and FIGS. 6C-D are cross-sectional side views. FIG. 6C shows rocker arm 642a in its initial rest position, e.g., when comb drive 640a (see FIG. 6A) is not activated. FIG. 6D illustrates motion of rocker arm 642a when comb drive 640a is activated to generate force F, which is transferred to the rocker arm by tether 638a, thereby causing the rocker arm to rotate about a sway axis defined by torsion rods 650. Since rocker arm 642a is connected to support beam 622 and rocker arm 642b (not shown in FIGS. 6B-D), the overall motion of these parts in RA actuator 620 with respect to support frame 670 is similar to that depicted in FIG. 3A.

OPCD actuator 660 is adapted to move support frame 670 as a whole such that this motion changes the offset distance between the support frame and substrate 602. More specifically, in the projection of FIG. 6A, the motion direction is generally out of the plane of the drawing. As a result, OPCD actuator 660 can generate translation of the movable plate attached to support pole 612 as further explained below, which translation is independent of the plate rotation generated by RA actuator 620.

Figure 6E:
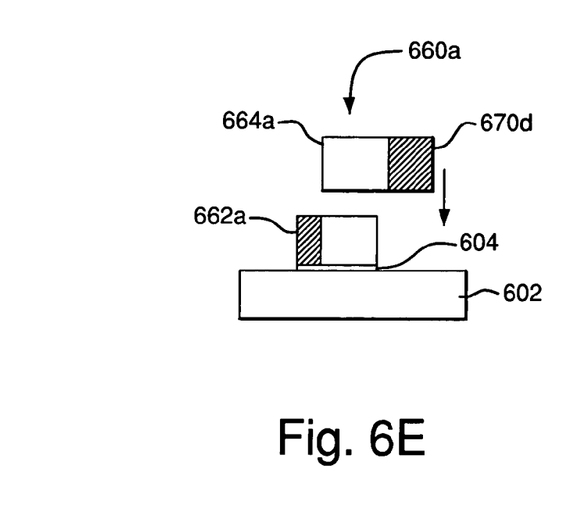

Referring now to FIGS. 6A and 6E, OPCD actuator 660 has two comb drives 660a-b, each having two interleaved comb portions 662 and 664. More specifically, comb drive 660a has comb portions 662a and 664a, and comb drive 660b has comb portions 662b and 664b. FIG. 6E shows an enlarged cross-sectional side view of comb drive 660a. Comb portion 662a of comb drive 660a is attached to substrate 602 such that a dielectric layer 604 located between the comb portion and the substrate provides electrical insulation between the two. As a result, comb portion 662a can be electrically biased with respect to substrate 602. Comb portion 664a of comb drive 660a is attached to side section 670d of support frame 670 and, as such, is electrically connected to substrate 602 via that side section, spring 674d, and support pad 676d (see FIG. 6A). When a voltage differential is applied between comb portion 662a and substrate 602 (and thus comb portion 664a), an attractive electrostatic force is generated between these comb portions, which causes comb portion 664a and side section 670d to move toward the substrate as indicated by the arrow in FIG. 6E. If comb drive 660b is similarly biased, then the resulting motion of support frame 670 is substantially pure translation toward substrate 602. However, if comb drive 660b receives a voltage differential different from that applied to comb drive 660a, then the resulting motion of support frame 670 is a combination of translation and rotation with respect to substrate 602. In a preferred embodiment, comb portions 662a-b are electrically connected together such that they have the same electric potential, which ensures that the motion of support frame 670 generated by OPCD actuator 660 is substantially pure translation with respect to substrate 602. Note that springs 674a-d provide counterbalance spring forces to the electrostatic forces generated by comb drives 660a-b. These spring forces return support frame 670 into the initial rest position when the voltage differential is removed.

Figure 7:
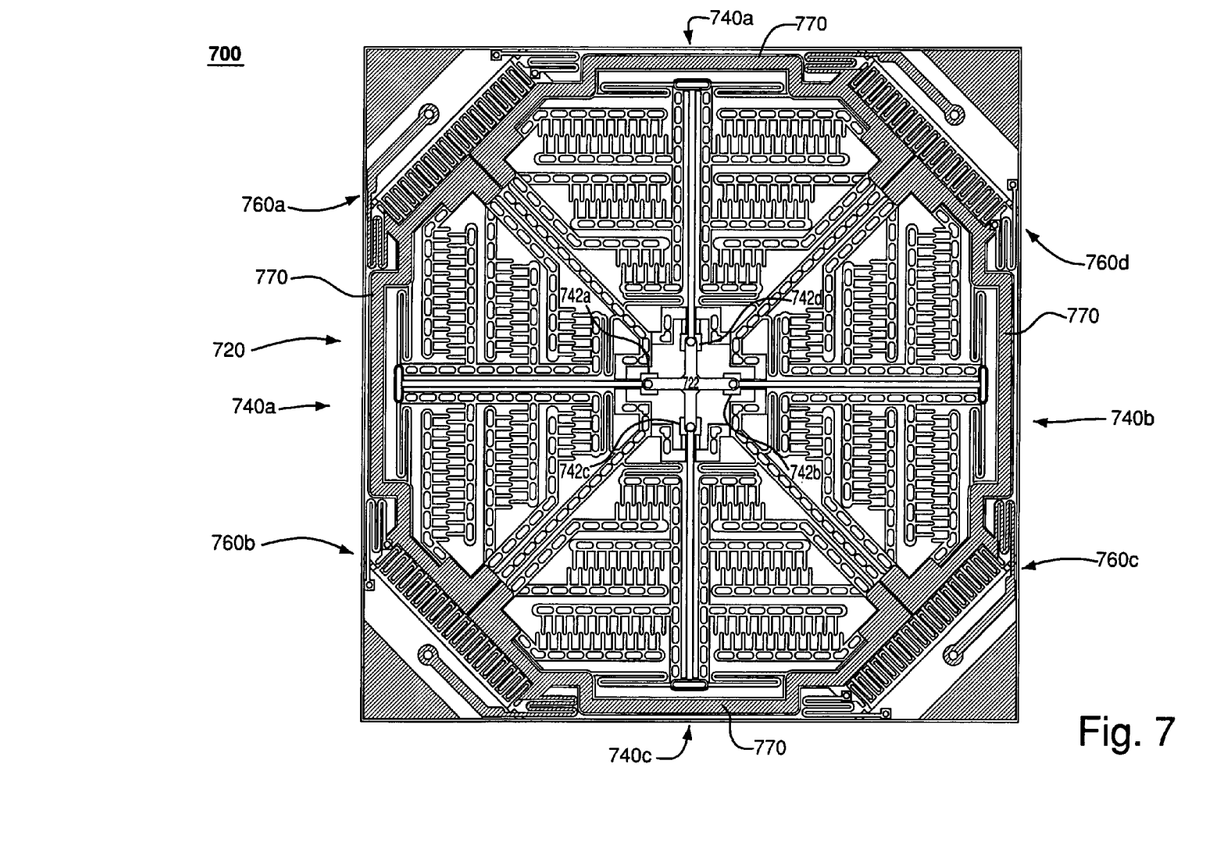
FIG. 7 shows a cutout top view of a MEMS device according to yet another embodiment of the invention.

FIG. 7 shows a cutout top view of a MEMS device 700 according to yet another embodiment of the invention. More specifically, the view of FIG. 7 is analogous to the view of FIG. 6A and exposes the layout of an RA actuator 720 and an OPCD actuator 760 in device 700, which are generally analogous to RA actuator 620 and OPCD actuator 660, respectively, of device 600. However, there are several differences between the actuators employed in devices 700 and 600, which differences are described in more detail below.

RA actuator 720 is different from RA actuator 620 in that RA actuator 720 has four rocker arms 742a-d as opposed to just two rocker arms 642a-b in RA actuator 620. Consequently, RA actuator 720 has (1) four comb drives 740a-d, each coupled to the corresponding rocker arm 742, and (2) an X-shaped support beam 722 connected to the four rockers arms. Comb drives 740a-b are adapted to generate rotation of a movable plate (not shown) mounted on support beam 722 with respect to a support frame 770 about a first rotation axis in a manner similar to that of comb drives 640a-b. Comb drives 740c-d are similarly adapted to generate rotation of the movable plate with respect to support frame 770 about a second rotation axis, which is substantially perpendicular to the first rotation axis. As a result, RA actuator 720 can perform a two-axis rotation of the movable plate with respect to support frame 770 as opposed to a single-axis rotation performed by RA actuator 620.

OPCD actuator 760 is different from OPCD actuator 660 in that OPCD actuator 760 has four comb drives 760a-d as opposed to two comb drives 660a-b in OPCD actuator 660. As a result, OPCD actuator 760 has four comb portions attached to support frame 770 and four comb portions attached to the substrate. In a preferred embodiment, the four comb portions attached to the substrate are electrically connected together to have the same electric potential to produce substantially pure translation of support frame 770 with respect to the substrate.

Other differences between the designs of devices 600 and 700 include, but are not limited to: (1) the bottom rocker-arm support is changed from a torsion rod pivot in device 600 to a cantilever pivot structure in device 700 to allow rocker arms 742 to more easily rotate in two directions; (2) the tethers joining rocker arms 742 to comb drives 740 have a relatively large length to ease lateral tilting of the rocker arms; and (3) some of the beam structures in comb drives 740a-d are partially hollowed out to reduce the weight of RA actuator 720 compared to that resulting from the solid-beam design employed in RA actuator 620.

Figure 8A:
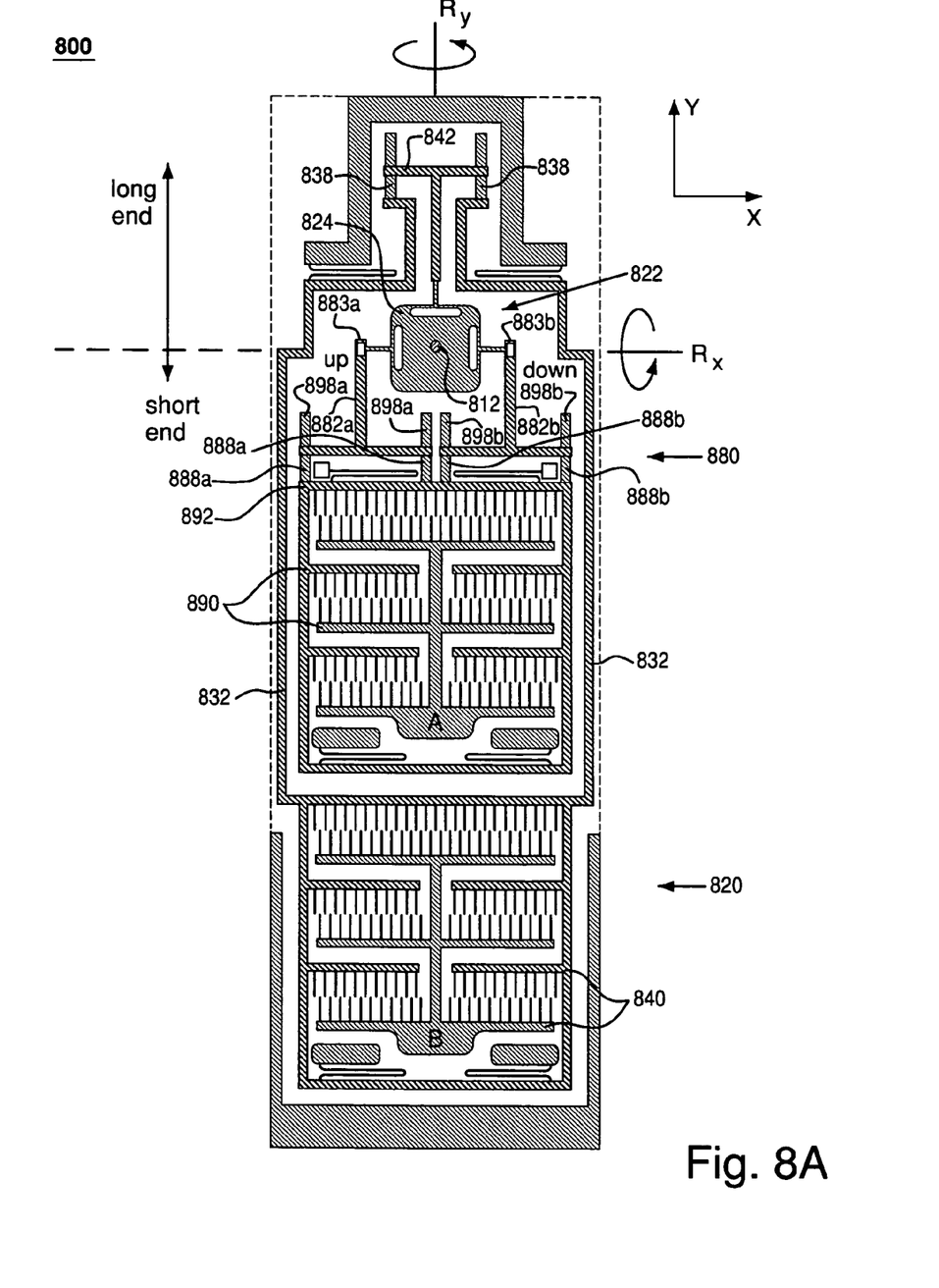
FIGS. 8A-B show cutout top and perspective three-dimensional views, respectively, of a MEMS device according to yet another embodiment of the invention.
Figure 8B:
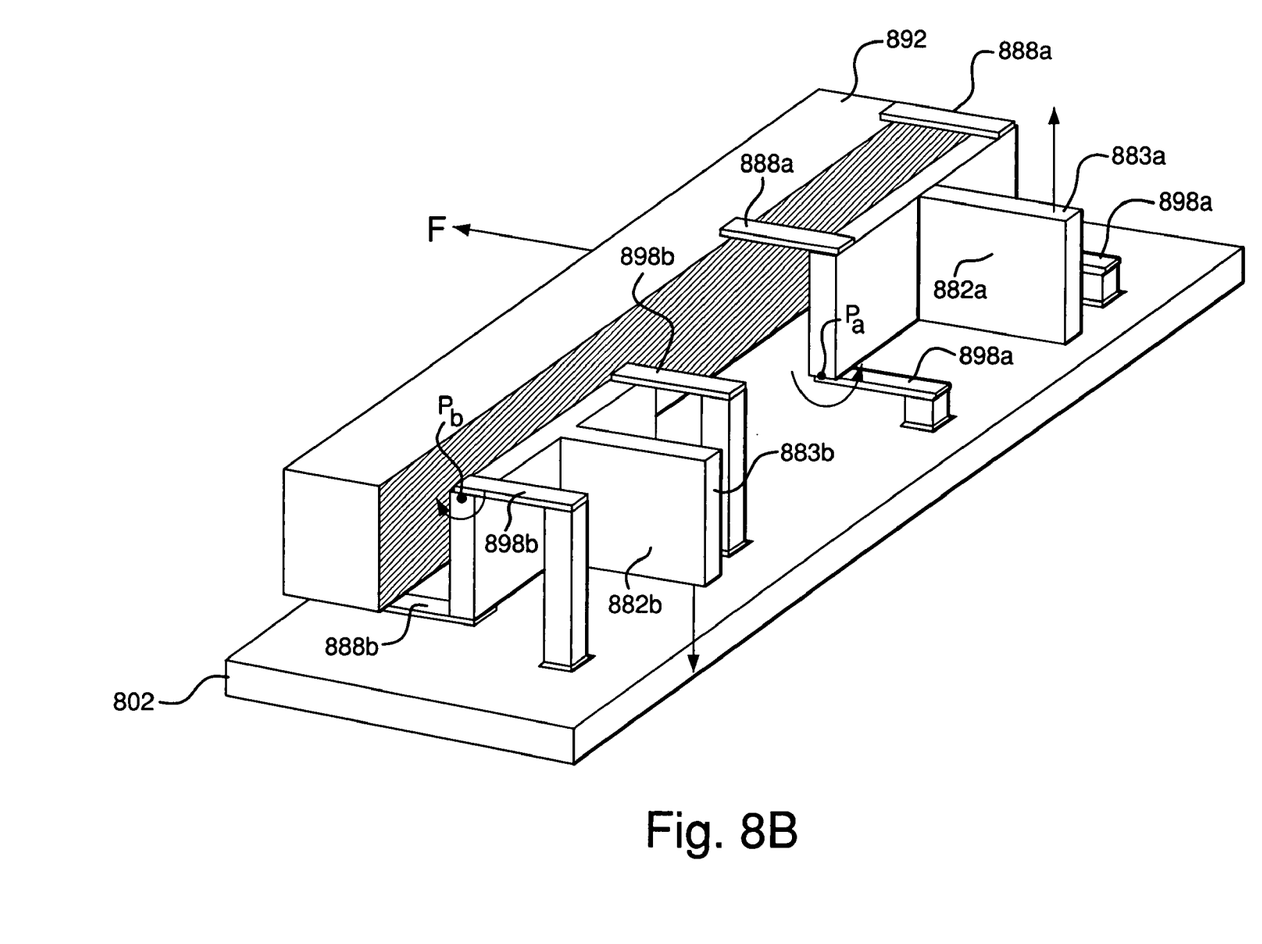

FIGS. 8A-B show cutout top and perspective three-dimensional views, respectively, of a MEMS device 800 according to yet another embodiment of the invention. More specifically, the view of FIG. 8A is analogous to the views of FIGS. 6A and 7, and FIG. 8B is a perspective three-dimensional view of a portion of device 800 having rocker arms 882a-b. In the view of FIG. 8A, the movable plate of device 800, which is analogous, e.g., to movable plate 110 (FIG. 1), is removed to expose the layout of (1) an RA actuator 820, which enables rotation of the movable plate about axis $R_x$, and (2) an RA actuator 880, which enables rotation of the movable plate about axis $R_y$. As such, device 800 enables a two-axis rotation for its movable plate.

In a preferred embodiment, the (not-shown) movable plate of device 800 is relatively long and narrow, and axis $R_x$ bisects the movable plate to define a relatively short portion (denoted as "short end" in FIG. 8A) and a relatively long portion (denoted as "long end" in FIG. 8A). In the projection of FIG. 8A, the short and long portions of the movable plate are located below and above axis $R_x$, respectively. The movable plate of device 800 attaches to a support pole 812. Support pole 812 is mounted on a support plate 824 of a support beam 822, which is connected between rocker arms 842, 882a, and 882b. Note that RA actuators 820 and 880 are both located adjacent to the short portion of the movable plate. As a result, a cavity or an opening in a substrate 802 (see FIG. 8B) of device 800 can be formed at the far tip of the long portion to accommodate a relatively large displacement of that tip during the plate rotation about axis $R_x$.

RA actuator 820 is similar to above-described RA actuators 120 (FIG. 1), 320 (FIG. 3), and 620 (FIG. 6) in that it generates rotation of the movable plate about an axis that is orthogonal to the displacement direction of the corresponding comb or shuttle in the actuator's comb drive. More specifically, RA actuator 820 has a comb drive 840 connected to rocker arm 842 via a shuttle 832 and tethers 838. When RA actuator 820 is activated, it pulls shuttle 832 along the Y direction, which causes rocker arm 842 to rotate in a manner similar to that of rocker arm 142a in FIG. 1C. This rocker-arm rotation causes support plate 824 to tilt, thereby tilting support pole 812 and rotating the movable plate of device 800 about axis $R_x$.

RA actuator 880 is different from RA actuators 120 (FIG. 1), 320 (FIG. 3), 620 (FIG. 6), and 820 (FIG. 8) in that, instead of generating rotation of the movable plate about an axis orthogonal to the displacement direction, it generates rotation about an axis that is parallel to the displacement direction. More specifically, RA actuator 880 has a comb drive 890 having a pull bar 892 connected to rocker arms 882a-b via tethers 888a and 888b, respectively (see also FIG. 8B). Rocker arm 882a is similar to, e.g., rocker arm 142a of FIG. 1 in that tethers 888a, which transfer the pull generated by the comb drive to the rocker arm, are attached to a top portion of the rocker arm, while tethers 898a, which anchor the rocker arm to substrate 802, are attached to a bottom portion of the rocker arm. As a result, when pull bar 892 pulls tethers 882a, rocker arm 882a is rotated about sway axis $P_a$ as shown in FIG. 8B, thereby moving a tip 883a of the rocker arm away from substrate 802. In contrast, for rocker arm 882b, tethers 888b, which transfer the pull to the rocker arm, are attached to a bottom portion of the rocker arm, while tethers 898b, which anchor the rocker arm to substrate 802, are attached to a top portion of the rocker arm. As a result, when pull bar 892 pulls tethers 882b, rocker arm 882b is rotated about sway axis $P_b$ as shown in FIG. 8B, thereby moving a tip 883b of the rocker arm toward substrate 802. When RA actuator 880 is activated, it pulls pull bar 892 along the Y direction, which causes rocker arms 882a-b to rotate in opposite directions. This opposing rocker-arm rotation in turn causes support plate 824 to tilt such that its sides coupled to tips 883a-b move away from and toward substrate 802, respectively, thereby tilting support pole 812 and rotating the movable plate of device 800 about axis $R_y$.

Figure 9:
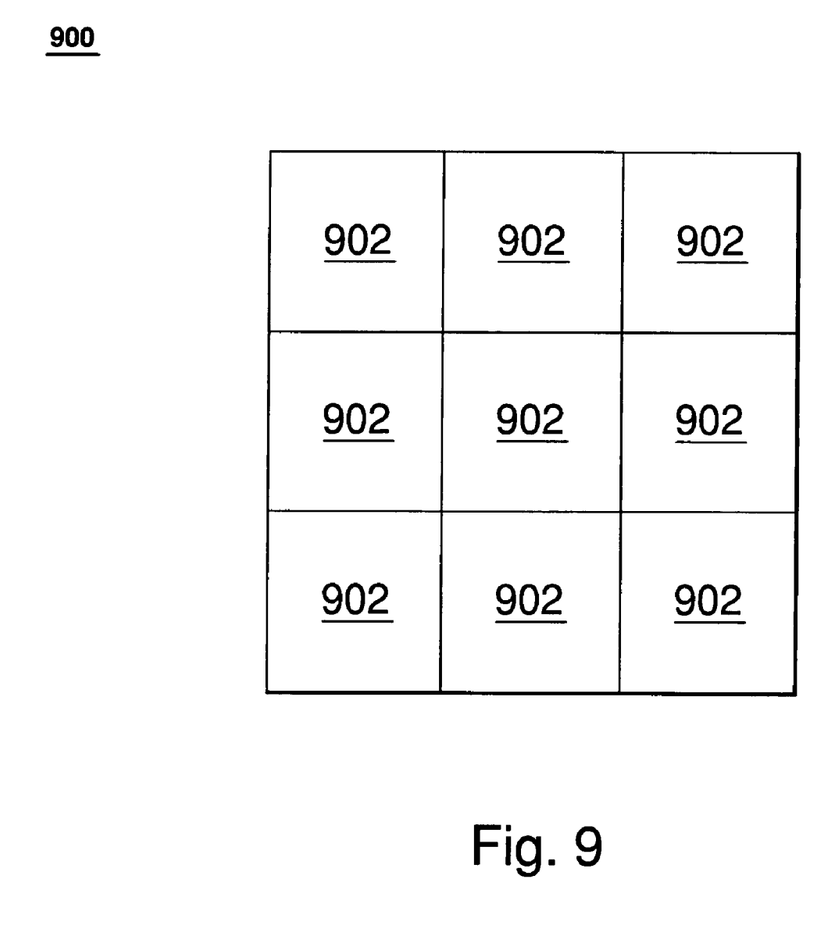
FIG. 9 shows a top view of an arrayed MEMS device according to one embodiment of the invention.

FIG. 9 shows a top view of an arrayed MEMS device 900 according to one embodiment of the invention. Device 900 has nine individual MEMS devices 902 arranged in three rows and three columns, where each device 902 can be device 100 (FIG. 1), 500 (FIG. 5), 600 (FIG. 6), 700 (FIG. 7), or 800 (FIG. 8). In other embodiments, other arrangements of individual MEMS devices can similarly be used without departing from the scope and principle of the invention.

Devices of the present invention may be fabricated, as known in the art, using layered (e.g., silicon-on-insulator) wafers. Additional layers of material may be deposited onto a wafer using, e.g., chemical vapor deposition. Various parts of the devices may be mapped onto the corresponding layers using lithography. Additional description of various fabrication steps may be found, e.g., in U.S. Pat. Nos. 6,201,631, 5,629,790, and 5,501,893, the teachings of which are incorporated herein by reference. Representative fabrication-process flows can be found, e.g., in U.S. Pat. No. 6,667,823 and U.S. patent application Ser. Nos. 10/395,362 (filed on Mar. 24, 2003), 10/741,491 (filed on Dec. 19, 2003), 10/772, 847 (filed on Feb. 5, 2004), and 10/796,618 (filed on Mar. 9, 2004), the teachings of all of which are incorporated herein by reference.

While this invention has been described with reference to illustrative embodiments, this description is not intended to be construed in a limiting sense. Various surfaces may be modified, e.g., by metal deposition for enhanced reflectivity and/or electrical conductivity or by ion implantation for enhanced mechanical strength. Differently shaped mirrors, plates, poles, beams, bars, rocker arms, tethers, shuttles, frames, pads, drives, electrodes, and/or actuators may be implemented without departing from the scope and principle of the invention. For example, a rocker arm may have a shape of a simple straight beam, a Γ-shaped beam, or a T-shaped beam. Springs may have different shapes and sizes, where the term "spring" refers in general to any suitable elastic structure that can recover its original shape after being distorted. A MEMS device of the invention may be implemented to have two rotation axes oriented at an arbitrary angle with respect to one another and/or not necessarily lying within the same plane. Alternatively or in addition, a MEMS device of the invention can be implemented to have a rotation axis, which is not parallel (e.g., orthogonal) to the plane of the substrate. In an implementation having a rotation axis that is orthogonal to the plane of the substrate, each rocker arm analogous to rocker arm 142 has a sway axis that is orthogonal to the plane of the substrate, and a top view of the device is substantially analogous to the side view shown, e.g., in FIG. 1B. Various MEMS devices of the invention may be arrayed as necessary and/or apparent to a person skilled in the art. An arrayed MEMS device of the invention can be designed for use in an adaptive optics application or a maskless lithography application, or both, or other suitable applications. Various modifications of the described embodiments, as well as other embodiments of the invention, which are apparent to persons skilled in the art to which the invention pertains are deemed to lie within the principle and scope of the invention as expressed in the following claims.

For the purposes of this specification, a MEMS device is a device having two or more parts adapted to move relative to one another, where the motion is based on any suitable interaction or combination of interactions, such as mechanical, thermal, electrical, magnetic, optical, and/or chemical interactions. MEMS devices are fabricated using micro- or smaller fabrication techniques (including nano-fabrication techniques) that may include, but are not necessarily limited to: (1) self-assembly techniques employing, e.g., self-assembling monolayers, chemical coatings having high affinity to a desired chemical substance, and production and saturation of dangling chemical bonds and (2) wafer/material processing techniques employing, e.g., lithography, chemical vapor deposition, patterning and selective etching of materials, and treating, shaping, plating, and texturing of surfaces. The scale/size of certain elements in a MEMS device may be such as to permit manifestation of quantum effects. Examples of MEMS devices include, without limitation, NEMS (nano-electromechanical systems) devices, MOEMS (micro-opto-electromechanical systems) devices, micromachines, Microsystems, and devices produced using Microsystems technology or microsystems integration.

Although the present invention has been described in the context of implementation as MEMS devices, the present invention can in theory be implemented at any scale, including scales larger than micro-scale.

What is claimed is:

1. A device, comprising a deformable beam connected between first and second rocker arms movably supported on a substrate, wherein:
   the first rocker arm is adapted to rotate with respect to the substrate about a first sway axis;
   the second rocker arm is adapted to rotate with respect to the substrate about a second sway axis;
   said rotations of the first and second rocker arms deform the deformable beam and cause the deformable beam to move with respect to the substrate; and
   said motion of the deformable beam defines a first rotation axis offset from the substrate by a first offset distance which is greater than an offset distance from the substrate for any part of the first and second rocker arms and the deformable beam.

2. The invention of claim 1, further comprising a plate mounted on the deformable beam such that said rotations of the first and second rocker arms produce rotation of the plate about the first rotation axis.

3. The invention of claim 2, wherein the first rotation axis lies within a plane of the plate.

4. The invention of claim 2, wherein the plate has a reflective surface.

5. The invention of claim 1, wherein the first rotation axis and the first and second sway axes are substantially parallel to one another.

6. The invention of claim 1, wherein:
   the first sway axis is substantially parallel to the second sway axis; and
   the first rotation axis is substantially orthogonal to the first and second sway axes.

7. The invention of claim 1, wherein the deformable beam is further connected to at least a third rocker arm movably supported on the substrate and adapted to rotate with respect to the substrate about a third sway axis, wherein said rotation of the third rocker arm deforms the deformable beam and causes the deformable beam to move with respect to the substrate such that said motion defines a second rotation axis offset from the substrate by a second offset distance.

8. The invention of claim 7, wherein the second rotation axis is substantially orthogonal to the first rotation axis.

9. The invention of claim 7, wherein the first and second offset distances are substantially equal.

10. The invention of claim 7, further comprising a plate mounted on the deformable beam such that said rotations of the rocker arms produce rotation of the plate about at least one of the first and second rotation axes.

11. The invention of claim 10, wherein the first and second rotation axes lie within a plane of the plate.

12. The invention of claim 1, wherein:
    the first and second rocker arms are mounted on a frame supported on the substrate such that each rocker arm is adapted to rotate with respect to the frame about the corresponding sway axis; and
    the frame is adapted to move with respect to the substrate together with the first and second rocker arms and the deformable beam.

13. The invention of claim 1, wherein the device comprises one or more electrostatic drives adapted to produce the rotations of the rocker arms.

14. The invention of claim 13, wherein the one or more electrostatic drives include an in-plane comb drive having two interleaved comb-shaped portions, one of which portions is adapted to move with respect to the other portion along a plane parallel to the substrate.

15. The invention of claim 1, wherein the deformable beam is a tether having a rigid plate.

16. The invention of claim 1, wherein the deformable beam includes one or more stretchable sections, wherein, if the first and second rocker arms rotate about the corresponding sway axes in opposite directions, the deformable beam is deformed and a portion of the deformable beam moves with respect to the substrate such that an offset distance from said portion to the substrate changes.

17. The invention of claim 1, wherein the deformable beam is further connected to third and fourth rocker arms movably supported on a substrate, wherein:
    the first, second, third, and fourth rocker arms are mounted on a frame supported on the substrate such that each rocker arm is adapted to rotate with respect to the frame about a corresponding sway axis;
    said rotations of the rocker arms deform the deformable beam and cause the deformable beam to move with respect to the frame such that said motion defines two rotation axes offset from the substrate by an offset distance; and
    the frame is adapted to move with respect to the substrate such that said motion changes the offset distance.

18. The invention of claim 17, further comprising a plate mounted on the deformable beam such that said rotations of the rocker arms produce rotations of the plate about at least one of the two rotation axis, both of which lie within a plane of the plate.

19. The invention of claim 1, wherein the device is an arrayed MEMS device having multiple instances of the deformable beam connected between the first and second rocker arms.

20. A method of operating a device having a deformable beam, the method comprising deforming the deformable beam using first and second rocker arms, each rocker arm connected to said beam and movably supported on a substrate, said beam deformed when the first rocker arm rotates with respect to the substrate about a first sway axis and the second rocker arm rotates with respect to the substrate about a second sway axis, said rotations of the first and second rocker arms deforming the deformable beam and causing the deformable beam to move with respect to the substrate, wherein said motion of the deformable beam defines a first rotation axis offset from the substrate by a first offset distance which is greater than an offset distance from the substrate for any part of the first and second rocker arms and the deformable beam.

21. A device, comprising a deformable beam connected between first and second rocker arms movably supported on a substrate, wherein:
    the first rocker arm is adapted to rotate with respect to the substrate about a first sway axis;
    the second rocker arm is adapted to rotate with respect to the substrate about a second sway axis;
    said rotations of the first and second rocker arms deform the deformable beam and cause the deformable beam to move with respect to the substrate;
    the first and second rocker arms are mounted on a frame supported on the substrate such that each rocker arm is adapted to rotate with respect to the frame about the corresponding sway axis; and
    the frame is adapted to move with respect to the substrate together with the first and second rocker arms and the deformable beam.

22. A device, comprising a deformable beam connected between first and second rocker arms movably supported on a substrate, wherein:
- the first rocker arm is adapted to rotate with respect to the substrate about a first sway axis;
- the second rocker arm is adapted to rotate with respect to the substrate about a second sway axis;
- said rotations of the first and second rocker arms deform the deformable beam and cause the deformable beam to move with respect to the substrate; and
- the device comprises one or more electrostatic drives adapted to produce the rotations of the rocker arms, wherein the one or more electrostatic drives include an in-plane comb drive having two interleaved comb-shaped portions, one of which portions is adapted to move with respect to the other portion along a plane parallel to the substrate.

23. A device, comprising a deformable beam connected between first and second rocker arms movably supported on a substrate, wherein:
- the first rocker arm is adapted to rotate with respect to the substrate about a first sway axis;
- the second rocker arm is adapted to rotate with respect to the substrate about a second sway axis;
- said rotations of the first and second rocker arms deform the deformable beam and cause the deformable beam to move with respect to the substrate;
- the deformable beam is further connected to third and fourth rocker arms movably supported on a substrate;
- the first, second, third, and fourth rocker arms are mounted on a frame supported on the substrate such that each rocker arm is adapted to rotate with respect to the frame about a corresponding sway axis;
- said rotations of the rocker arms deform the deformable beam and cause the deformable beam to move with respect to the frame such that said motion defines two rotation axes offset from the substrate by an offset distance; and
- the frame is adapted to move with respect to the substrate such that said motion changes the offset distance.

24. The invention of claim 23, further comprising a plate mounted on the deformable beam such that said rotations of the rocker arms produce rotations of the plate about at least one of the two rotation axis, both of which lie within a plane of the plate.

* * * * *